United States Patent
Choi et al.

(10) Patent No.: US 12,291,143 B2
(45) Date of Patent: May 6, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Jung hun Choi, Gyeonggi-do (KR); Dong Hyun Ha, Seoul (KR); Jae Wung Jung, Gyeonggi-do (KR)

(73) Assignees: Hyundair Motor Company, Seoul (KR); Kia Corporation, Seoul (KR)

( * ) Notice: Subject to any disclaimer, the term of this patent is extended or adjusted under 35 U.S.C. 154(b) by 274 days.

(21) Appl. No.: 17/942,375

(22) Filed: Sep. 12, 2022

(65) Prior Publication Data

US 2023/0158944 A1    May 25, 2023

(30) Foreign Application Priority Data

Nov. 25, 2021    (KR) ........................ 10-2021-0164790

(51) Int. Cl.
*B60Q 1/24* (2006.01)
*B60W 30/09* (2012.01)
*B60W 30/095* (2012.01)
*G08G 1/16* (2006.01)

(52) U.S. Cl.
CPC ............ *B60Q 1/247* (2022.05); *B60W 30/09* (2013.01); *B60W 30/0956* (2013.01); *G08G 1/166* (2013.01); *B60W 2420/403* (2013.01); *B60W 2552/00* (2020.02); *B60W 2554/4029* (2020.02)

(58) Field of Classification Search
CPC ........ B60Q 1/0023; B60Q 1/247; B60Q 1/50; B60Q 1/525; B60Q 1/547; B60Q 9/008; B60Q 2300/114; B60Q 2400/50; B60W 30/08; B60W 30/09; B60W 30/0956; B60W 40/02; B60W 40/107; B60W 2420/403; B60W 2520/125; B60W 2552/00; B60W 2554/4029; G08G 1/163; G08G 1/166
See application file for complete search history.

(56) References Cited

U.S. PATENT DOCUMENTS

| | | | |
|---|---|---|---|
| 10,311,770 B2* | 6/2019 | Ishizuka ................ | B60Q 1/247 |
| 2016/0046289 A1* | 2/2016 | Elbs ...................... | B60Q 1/381 |
| | | | 701/49 |
| 2017/0001554 A1* | 1/2017 | Sørensen ............... | B60Q 1/346 |
| 2017/0210282 A1* | 7/2017 | Rodriguez Barros . | B60Q 1/324 |
| 2018/0170373 A1* | 6/2018 | Kwon .................... | G08G 1/166 |
| 2018/0362021 A1* | 12/2018 | Imamura ............... | B60W 10/06 |
| 2019/0161943 A1* | 5/2019 | Frank ...................... | E02F 9/24 |
| 2019/0193629 A1* | 6/2019 | Zevenbergen ......... | B60Q 1/543 |
| 2021/0101526 A1* | 4/2021 | Lacher .................. | B60Q 1/547 |

(Continued)

*Primary Examiner* — Jason Holloway
*Assistant Examiner* — Blake A Wood
(74) *Attorney, Agent, or Firm* — Morgan, Lewis & Bockius LLP

(57) ABSTRACT

A vehicle includes a display configured to emit light to a ground surface, a communicator configured to receive a movement signal of the vehicle through communication with an external terminal, and a controller communicatively connected to the communicator and configured to determine a moving area of the vehicle based on the received movement signal of the vehicle, determine a danger area and a safety area included in the moving area, and control the display to emit light to the danger area and the safety area.

20 Claims, 15 Drawing Sheets

(56) References Cited

U.S. PATENT DOCUMENTS

| | | | |
|---|---|---|---|
| 2021/0206314 A1* | 7/2021 | Fukumoto | B60R 21/34 |
| 2021/0300234 A1* | 9/2021 | Muramatsu | B60Q 1/143 |
| 2022/0153187 A1* | 5/2022 | Ching | B60Q 1/525 |

* cited by examiner

FIG. 8A

| LATERAL ACCELERATION | LIGHT EMISSION AREA (DIAMETER OF SEMICIRCLE) |
|---|---|
| 1 | 2.5 |
| 0.9 | 2.3 |
| 0.8 | 2 |
| 0.7 | 1.8 |
| 0.6 | 1.6 |
| 0.5 | 1.5 |
| 0.4 | 1.2 |
| 0.3 | 0.8 |

VEHICLE AND METHOD OF CONTROLLING THE SAME

CROSS-REFERENCE TO RELATED APPLICATION

The present application claims priority to Korean Patent Application No. 10-2021-0164790, filed on Nov. 25, 2021, the entire contents of which is incorporated herein for all purposes by this reference.

BACKGROUND OF THE PRESENT DISCLOSURE

Field of the Present Disclosure

The present disclosure relates to a vehicle for four-wheel independent driving and steering which is capable of displaying a collision risk area in response to the vehicle being in motion, and a method of controlling the same.

Description of Related Art

The existing vehicles steer wheels only in two modes (a straight mode, and a left/right turn), so that intuitive driving is performable using a small number of control systems. In contrast, a four-wheel independent steering system (4WS) may control each wheel independently, providing various vehicle behaviors.

While the 4WS generates various behaviors, drivers and pedestrians may have a difficulty in predicting a moving area of the vehicle.

Accordingly, there is a demand for a technology of a vehicle provided with a 4WS which is capable of determining a moving area of the vehicle and displaying the moving area in a surrounding area of the vehicle to prevent prevention and provide driver's convenience.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and a method of controlling the same that are configured for determining a moving area of the vehicle, determining a danger area and a safety area included in the moving area, and indicating the danger area and the safety area by emitting light to the danger area and the safety area.

The technical objectives of the present disclosure are not limited to the above, and other objectives may become apparent to those of ordinary skill in the art based on the following descriptions.

According to an aspect of the present disclosure, there is provided a vehicle including a display configured to emit light to a ground surface, a communicator configured to receive a movement signal of the vehicle through communication with an external terminal, and a controller communicatively connected to the communicator and configured to determine a moving area of the vehicle based on the received movement signal of the vehicle, determine a danger area and a safety area included in the moving area, and control the display to emit light to the danger area and the safety area.

The controller may be configured to determine detect an obstacle around the vehicle using at least one camera provided in the vehicle and the external terminal and determine a route path avoiding the obstacle as the moving area.

The controller may vary a light emission area according to a lateral acceleration of the vehicle, and determine the lateral acceleration from a starting torque value of the vehicle and specifications of the vehicle.

The controller may be configured to determine a turning center and a moving radius of the vehicle based on a driving torque of the vehicle and specifications of the vehicle to determine the moving area.

The controller may be configured to indicate the moving area so that the danger area and the safety area are differentiated by emission colors and intensities of light.

The controller may be configured to divide the danger area into a first area corresponding to a semicircle having a vehicle length of the vehicle as a diameter thereof, and a second area corresponding to a remaining portion of the danger area, and the second area may have a light emission area which is varied according to a lateral acceleration determined from a starting torque value of the vehicle and specifications of the vehicle.

The controller may be configured to increase the diameter of the semicircle of the light emission area based on the lateral acceleration being increased.

The controller may be configured to determine the moving area based on a manipulation of a steering wheel or a direction of a turn signal of the vehicle.

The controller may be configured to determine a road surface roughness with a wheel level sensor of the vehicle to perform a level correction, and detect an obstacle around the vehicle using at least one camera provided in the vehicle and the external terminal to determine the moving area.

According to an aspect of the present disclosure, there is provided a method of controlling a vehicle, the method including: emitting light to a ground surface; receiving a movement signal of the vehicle through communication with an external terminal; determining a moving area of the vehicle based on the received movement signal of the vehicle; determining a danger area and a safety area included in the moving area; and emitting light to the danger area and the safety area.

The method may further include varying a light emission area according to a lateral acceleration determined from a starting torque value of the vehicle and specifications of the vehicle.

The determining of the moving area of the vehicle may include detecting an obstacle around the vehicle using at least one camera provided in the vehicle and the external terminal to determine the moving area.

The determining of the moving area may include determining a turning center and a moving radius of the vehicle based on a driving torque of the vehicle and specifications of the vehicle to determine the moving area.

The emitting of light to the danger area and the safety area may include indicating the moving area so that the danger area and the safety area are differentiated by emission colors and intensities of light.

The emitting of light to the danger area and the safety area may include dividing the danger area into a first area corresponding to a semicircle having a vehicle length of the vehicle as a diameter thereof, and a second area corresponding to a remaining portion of the danger area; and the second area may have a light emission area which is varied according to a lateral acceleration determined from a starting torque value of the vehicle and specifications of the vehicle.

The varying of the light emission area may include increasing the diameter of the semicircle of the light emission area based on the lateral acceleration being increased.

The emitting of light to the danger area and the safety area may include emitting light based on a manipulation of a steering wheel or a direction of a turn signal of the vehicle.

The determining of the moving area of the vehicle may include determining a road surface roughness with a wheel level sensor of the vehicle to perform a level correction, and detecting an obstacle around the vehicle using at least one camera provided in the vehicle and the external terminal to determine the moving area.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 8A and FIG. 8B are diagrams illustrating a relationship between a lateral acceleration and a light emission area in the vehicle according to the embodiment;

Figure 1:
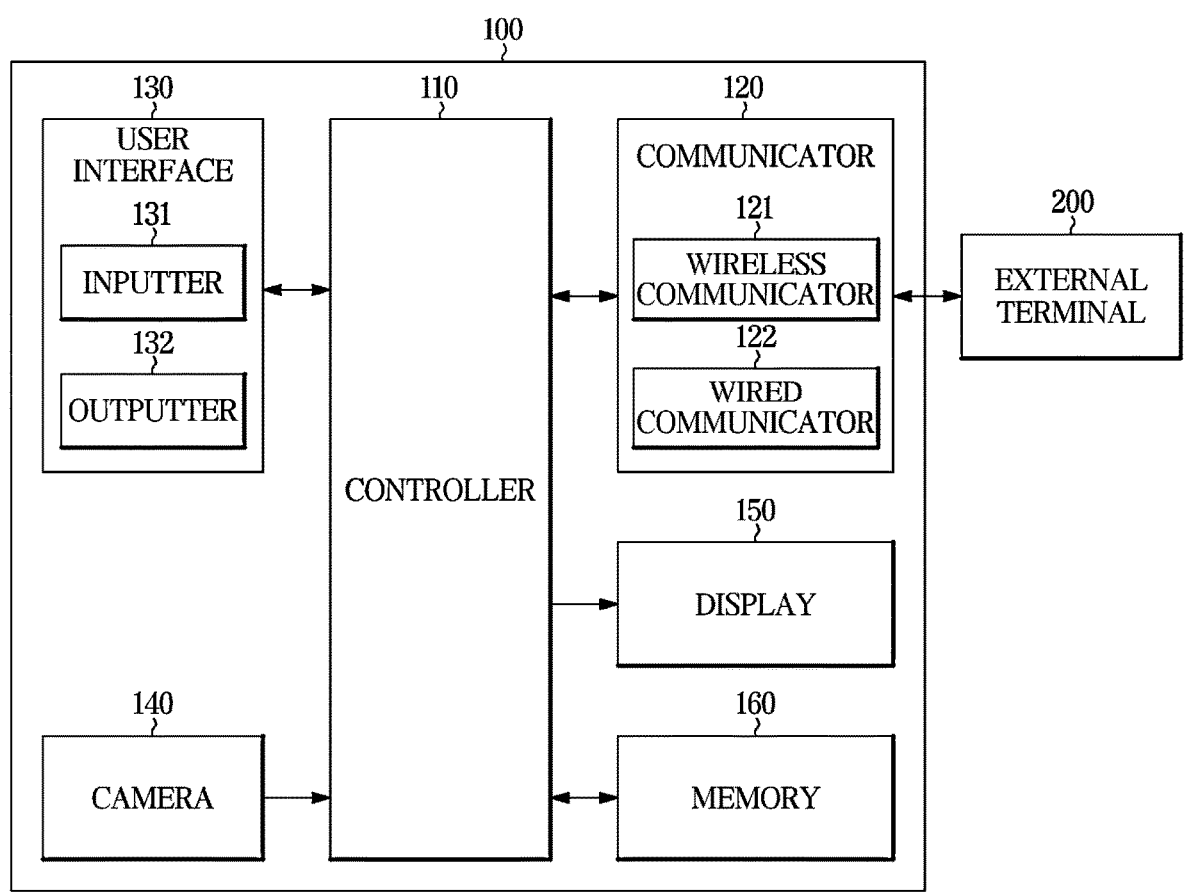
FIG. 1 is a diagram illustrating a control block diagram illustrating a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments described in the present specification and the configurations shown in the drawings are only examples of exemplary embodiments of the present disclosure, and various modifications may be made at the time of filing of the present disclosure to replace the exemplary embodiments and drawings of the present specification.

Identical symbols or numbers in the drawings of the present disclosure denote components or elements configured to perform substantially identical functions.

The terms used herein are for describing the exemplary embodiments and are not intended to restrict and/or to limit the present disclosure. For example, the singular expressions herein may include plural expressions, unless the context clearly dictates otherwise. Furthermore, the terms "comprises" and "has" are intended to display that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to differentiate one component from another. For example, without departing from the scope of the present disclosure, the first component may be referred to as a second component, and similarly, the second component may in addition be referred to as a first component.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Meanwhile, the disclosed exemplary embodiments of the present disclosure may be embodied in a form of a recording medium storing instructions executable by a computer. The instructions may be stored in a form of program code, and when executed by a processor, may generate a program module to perform the operations of the disclosed exemplary embodiments of the present disclosure. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Hereinafter, an exemplary embodiment of a vehicle 100 and a method of controlling the vehicle 100 according to one aspect will be described in detail with reference to the accompanying drawings.

FIG. 1 is a diagram illustrating a control block diagram illustrating a vehicle 100 according to an exemplary embodiment of the present disclosure.

Referring to FIG. 1, a vehicle 100 includes a communicator 120 for performing wired/wireless communication with external and internal devices, a user interface 130 for indicating a warning, and a camera 140 for photographing surroundings of the vehicle 100, a display 150 for emitting light to the ground, a memory 160 for storing information required for control related to the vehicle 10 in a transitory or non-transitory manner, and a controller 110 for controlling the above-described components.

Furthermore, the vehicle 100 may control the communicator 120 by the controller 110 to wirelessly communicate with an external terminal 200, such as a smartphone or a notebook computer.

The communicator 120 may communicate with another vehicle 700 or traffic infrastructure through a wireless communication base station, and may include a wireless communicator 121 and a wired communicator 122.

As an example of the communication method, the communicator 120 may employ the second generation (2G) communication method, such as Time Division Multiple Access (TDMA) and Code Division Multiple Access (CDMA), the third generation (3G) communication method, such as a wideband code Wide Code Division Multiple Access (WCDMA), Code Division Multiple Access 2000 (CDMA2000), Wireless Broadband (Wibro), and Worldwide Interoperability for Microwave Access (WiMAX), and the fourth generation (4G) communication method, such as Long Term Evolution (LTE) and WiBro Evolution. The communicator 120 may employ the fifth generation (5G) communication method.

The communicator 120 may include one or more components that enable communication with an external device, and may include, for example, at least one of a short-range communication module, a wired communicator 122, and a wireless communicator 121.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The wired communicator 122 may include various wired communicators 122, such as a controller area network (CAN) communication module, a local area network (LAN) module, a wide area network (WAN) module, or a value added network communication (VAN) module, and may also include various cable communication modules, such as a universal serial bus (USB), a high definition multimedia interface (HDMI), a digital visual interface (DVI), a recommended standard-232 (RS-232), a power line communication module, or a plain old telephone service (POTS).

The wireless communicator 121 may include Radio Data System-Traffic Message Channel (RDS-TMC), Digital Multimedia Broadcasting (DMB), Wi-Fi module, Wi-Bro module, and may also include a wireless communicator 121 that supports a global System for Mobile Communication (GSM), CDMA, WCDMA, universal mobile telecommunications system (UMTS), TDMA, LTE, etc.

The wireless communicator 121 may include a wireless communication interface including an antenna and a receiver for receiving a control signal of the vehicle 100. Furthermore, the wireless communicator 121 may further include a traffic information signal conversion module for demodulating an analog wireless signal received through the wireless communication interface into a digital control signal.

The communicator 120 may be configured to, when direction information of the vehicle 100 and acceleration information of the vehicle 100 are collected, transmit the collected data to the controller 110, or when a control signal for requesting information from the other vehicle 700 is received from the controller 110, transmit the control signal to the other vehicle 700.

The user interface 130 may include an inputter 131 and an outputter 132. The inputter 131 may receive a command related to displaying a danger area 300 and a safety area 400 from the user and transmit the command to the controller 110, and the outputter 132 may display a warning message or a notification about display of the danger area 300 and safety area 400.

The user interface 130 may include an Audio Video Navigation (AVN) display. However, in an exemplary embodiment of the present disclosure, the inputter 131 for receiving a user command and the outputter 132 for displaying a notification are not limited to the AVN display.

The user interface 130 is not limited to the AVN display and the inputter 131 may be variously provided as long as it can allow a user to input a command and the outputter 132 may be variously provided as long as it can allow the user to identify displayed contents and present a warning message.

For example, the inputter 131 may be an automotive voice recognition system for a vehicle, and the outputter 132 may be an internal speaker of the vehicle 100 that outputs sound.

When a user utters a command with a speech, the automotive voice recognition system may analyze the input command to determine a domain corresponding to the command and perform an operation.

Accordingly, when the inputter 131 is implemented using an automotive voice recognition system for a vehicle, the user may activate or deactivate the display 150 of the vehicle 100 by a speech.

Furthermore, the inputter 131 may be used for an electric system for controlling the vehicle 100, and may control an air conditioning system of the vehicle 100 or input a destination into a navigation system through speech recognition.

Furthermore, the outputter 132 may display information indicating the state of the vehicle 100, display information for guiding setting of the vehicle 100, display a navigation screen, display multimedia content, or display driving related information.

The camera 140 may be mounted in at least one position inside the vehicle 100 in which the surroundings of the vehicle 100 is photographable.

Alternatively, the external terminal 200 provided with the camera 140 may be connected to the vehicle 100 to perform the function of the camera 140 for photographing the surroundings of the vehicle 100. The connection between the external terminal 200 and the vehicle 100 may be performed through wireless communication, such as Bluetooth, or through a wired cable.

The camera 140 may be a built-in cam (Drive Video Record System: DVRS) mounted on the vehicle 100 or a black box separately mounted in the vehicle 100, but the present disclosure is not limited thereto.

The camera 140 may be provided using any configuration as long as it is an image device configured for obtaining a surrounding image of the vehicle 100 by photographing surroundings of the vehicle 100.

The display 150 may be configured to emit light to the surrounding of the vehicle 100 so that a driver or an external object may visually detect the light.

The display 150 may include a puddle lamp mounted on a side mirror of the vehicle 100 in an exemplary embodiment of the present disclosure, and the puddle lamp may be provided on a lower portion of the side mirror of the vehicle 100 and emit light onto the road surface to differently display a danger area 300 and a safety area 400.

The puddle lamp may include a micro lens array (MLA) in which a condensing lens, an image pattern, and a projection lens are formed as one body, so that the puddle lamp including such a compact package may be easily provided on the lower portion of the vehicle 100.

The controller 110 may adjust an emission area by varying the inclination of the puddle lamp, to vary a light emission area according to a change of the danger area 300.

A configuration for adjusting the inclination of the puddle lamp in the vehicle 100 according to the exemplary embodiment of the present disclosure may include an actuator and an operating rod.

When the controller 110 adjusts the length of the operating rod to increase, the puddle lamp is lowered, so that the inclination with the road surface becomes gentle, which causes the emission area to be lengthened. Conversely, when the controller 110 adjusts the length of the operating rod to decrease, the puddle lamp is lifted so that the inclination with lamp on the road surface becomes steep, which causes the emission area to be shortened.

When the display 150 is configured as a puddle lamp as described above, the emission area may be controlled to be varied according to various exemplary embodiments of the present disclosure.

The display 150 may include a headlamp of the vehicle 100 according to an exemplary embodiment of the present disclosure.

The headlamp of the vehicle 100 is a safety device configured to emit light to the front of the vehicle 100, so that the front view of the user is secured in a wide range to prevent an accident.

The headlamp of the vehicle 100 may not only secure the front view of the vehicle 100, but may also display content on the ground in front of the vehicle 100 using a pixel light headlamp for the vehicle 100.

The controller 110 may display information related to a moving area of the vehicle 100 on the ground to notify an external object of the moving area of the vehicle 100, and may adjust an emission area of the headlamp so that the light emission area is varied according to a change of the danger area 300, The memory 160 may be used to store images of the surrounding of the vehicle 100 captured by the camera 140 provided in the vehicle 100 in units of frames. Furthermore, the memory 160 may be used to store a control signal received by the external terminal 200 through the communicator 120.

The memory 160 may include a volatile memory 160, such as a Static Random Access Memory (S-RAM), D-RAM, etc., and a non-volatile memory 160, such as a read only memory (ROM) and an erasable programmable read only memory (EPROM). The memory 160 may include a single memory element 160 or a plurality of memory elements 160.

The controller 110 may control the communicator 120, the user interface 130, the camera 140, the display 150, and the memory 160 to emit light onto the road surface so that a danger area 300 and a safety area 400 are differently displayed.

The controller 110 may receive a control signal related to movement of the vehicle 100 from the external terminal 200, and analyze image data obtained from the camera 140 into a plurality of image frames to determine whether an obstacle exists on a moving route.

The controller 110 may be configured to, upon determining that an obstacle exists, exclude an area in which the obstacle exists from a moving area.

The controller 110 may be configured to determine a moving area of the vehicle 100 based on a movement signal received from the external terminal 200, and may divide the moving area into a danger area 300 and a safety area 400.

The controller 110 may be configured to, based on the danger area 300 and the safety area 400 being determined, control the display 150 to emit light to the danger area 300 and the safety area 400, so that an external object may easily identify the moving area of the vehicle 100 with the naked eyes.

Furthermore, even the driver of the vehicle 100 may easily predict the moving area of the vehicle 100 of a four-wheel independent steering system, even when the moving area of the vehicle 100 is difficult for the driver and the pedestrian 600 to predict due to various behaviors of the vehicle 100 of a four-wheel independent steering system.

Accordingly, both the external object, such as the pedestrian 600 and the other vehicle 700, and the driver may easily predict the moving area of the vehicle 100, effectively preventing an accident of the vehicle 100.

Hereinafter, a method of determining a moving area of the vehicle 100 and displaying the determined area separately as a danger area 300 and a safety area 400 by each configuration will be described in detail.

Figure 2:
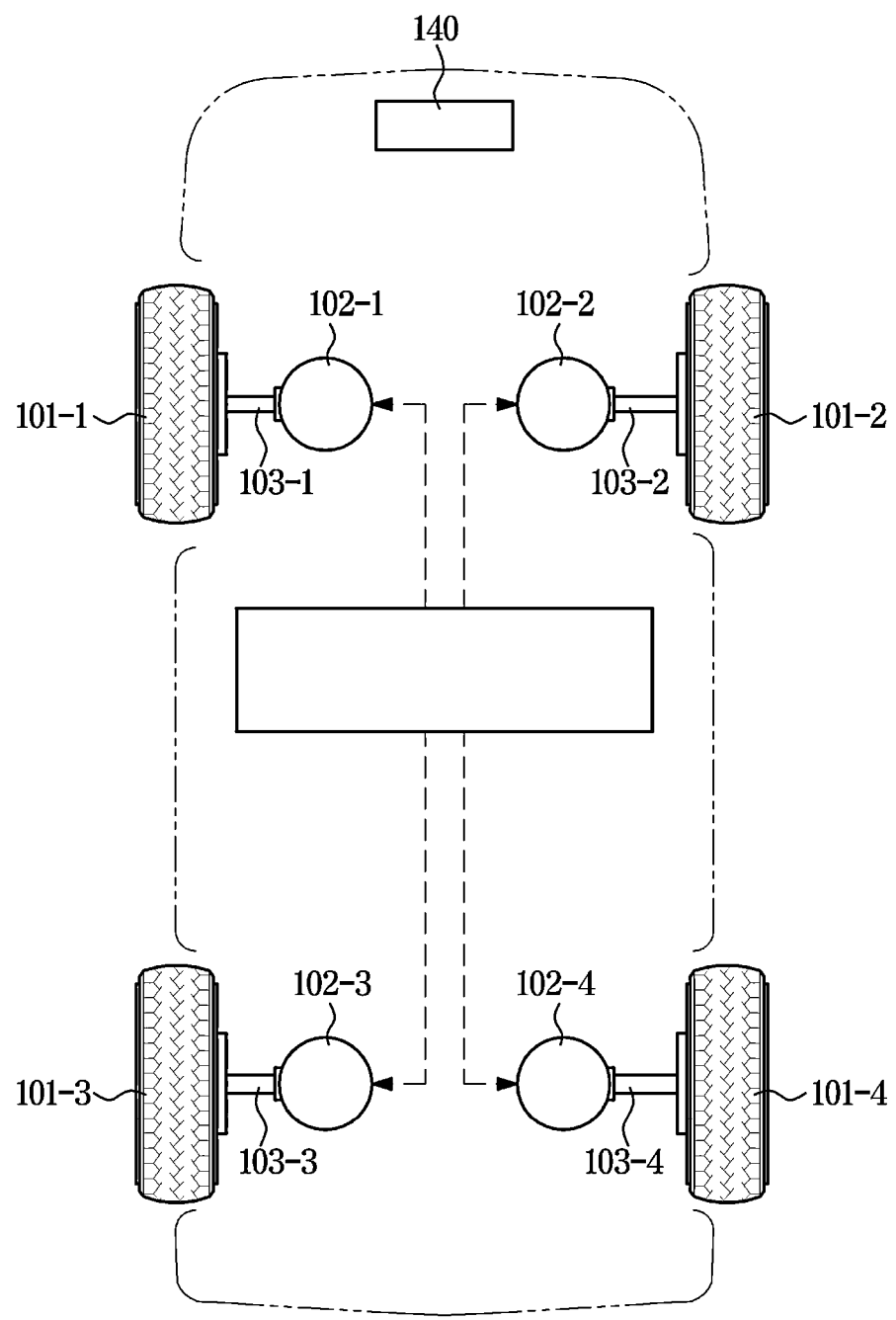
FIG. 2 is a view exemplarily illustrating a steering structure for four-wheel independent driving in a vehicle according to an exemplary embodiment of the present disclosure.

FIG. 2 is a view exemplarily illustrating a steering structure for four-wheel independent driving in the vehicle 100 according to the embodiment.

Referring to FIG. 2, the vehicle 100 may be provided with the camera 140 for photographing the front of the vehicle 100, and the camera 140 may be used to capture a surrounding image of the vehicle 100 to determine whether an obstacle exists.

The vehicle 100 including a steering structure for four-wheel independent driving may include four wheel tires 101-1, 101-2, 101-3, and 101-4, four steering actuators 102-1, 102-2, 102-3, and 102-4, and four steering linkages 103-1, 103-2, 103-3, and 103-4.

The vehicle 100 for four wheel independent driving may be divided into an active type four wheel independent driving vehicle that adjusts a rear toe using an actuator or the like and a passive type four wheel independent driving vehicle in which a toe is adjusted by a lateral pressure during cornering through geometry according to a control method.

The vehicle 100 according to the exemplary embodiment of the present disclosure may be provided as an active control vehicle including the steering actuators 102-1, 102-2, 102-3, and 102-4 and the steering linkages 103-1, 103-2, 103-3, and 103-4 on the four wheels, respectively, so that the driver may directly control steering of each wheel.

Each of the steering actuators 102-1, 102-2, 102-3, and 102-4 is a component that converts operating energy of steering wheel manipulation into a mechanical displacement, and may include a hydraulic actuator.

Each of the steering linkages 103-1, 103-2, 103-3, and 103-4 is a device configured for changing the heading direction of the vehicle with a steering linkage device, and may be configured to transmit the motion of a steering gear to the wheel. Each of the steering linkages 103-1, 103-2, 103-3, and 103-4 may be classified into a cross-link type steering linkage used for integral axle suspensions, a symmetric link type steering linkage used for independent suspensions, a rack and pinion link type steering linkage, and a center arm type steering linkage.

In the instant case, because the vehicle 100 according to the exemplary embodiment of the present disclosure is provided with the steering linkages 103-1, 103-2, 103-3, and 103-4 on all four wheels, respectively, the motion of each steering gear may be transmitted to the corresponding wheel, so that the turning radius may be small, and a rotation in place or a crab walk of diagonal motion may also performable.

The vehicle 100 is not limited thereto and may be provided in various configurations as long as it can perform four wheel independent steering, and display a moving area of the vehicle 100 separately as a danger area 300 and a safety area 400.

Figure 3:
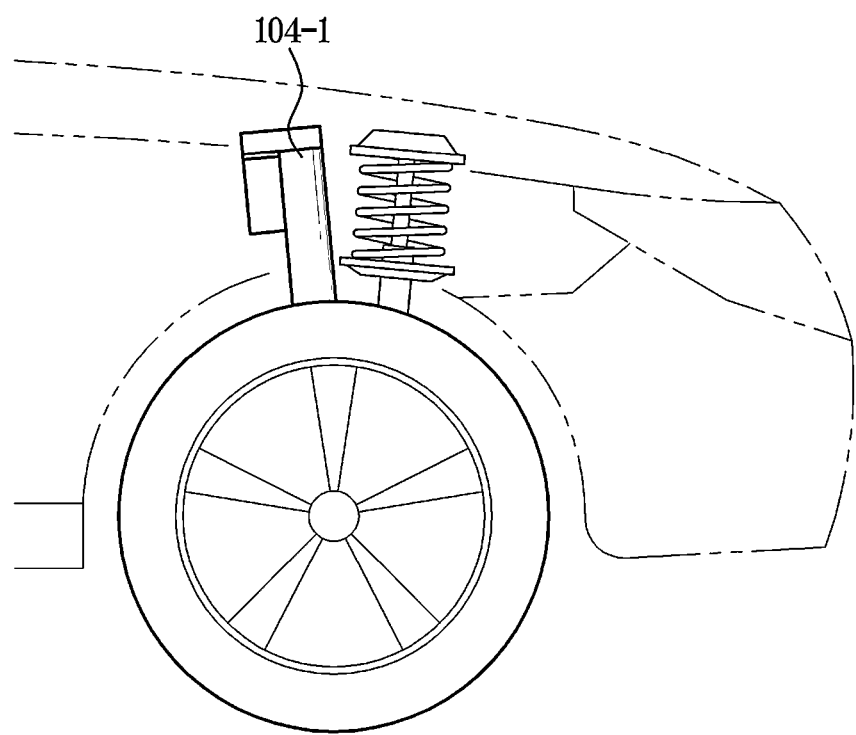
FIG. 3 is a diagram illustrating a structure of a vehicle for correcting a level difference of a road surface in a vehicle according to an exemplary embodiment of the present disclosure.

FIG. 3 is a diagram illustrating a structure of a vehicle for correcting a level difference of a road surface in the vehicle 100 according to the embodiment.

Referring to FIG. 3, a wheel height actuator 104-1 for adjusting the height of the vehicle 100 is shown.

The wheel height actuator 104-1 may be provided on each of the wheels, and may be used to increase the vehicle height from the ground when the vehicle 100 is in an off-road driving, and decrease the vehicle height from the ground when the vehicle 100 is in an on-road driving.

The wheel height actuator 104-1 may be used to maintain a horizontal state of the vehicle 100 and completely transmit a rotation force on a ground having an irregular ground level, such as off-roads.

The wheel height actuator 104-1 may be divided into a mechanical type wheel height actuator and an electronic type wheel height actuator, but may be provided without limitation as long as it can adjust the wheel height.

The controller 110 may control the wheel height actuator 104-1 to maintain the horizontal state of the vehicle 100 even on an uneven road surface, so that the influence of the road surface condition may be minimized when determining a moving area of the vehicle 100.

The controller 110 may determine the wheel step difference of all wheels of the vehicle 100, and may control the wheel height actuator 104-1 so that the wheel step difference is minimized.

In the instant case, the controller 110 may determine a horizontal state with a gyro sensor of the vehicle 100, and the gyro sensor may measure a rotational repulsion force generated when an object including a gyroscope rotates, and converts the measured rotational repulsion force into an electrical signal to measure the horizontal state.

Accordingly, the vehicle 100 according to the exemplary embodiment of the present disclosure may measure the lateral acceleration in a horizontal state of the vehicle 100, and display the danger area 300 and the safety area 400 while minimizing the influence of the road surface.

Figure 4:
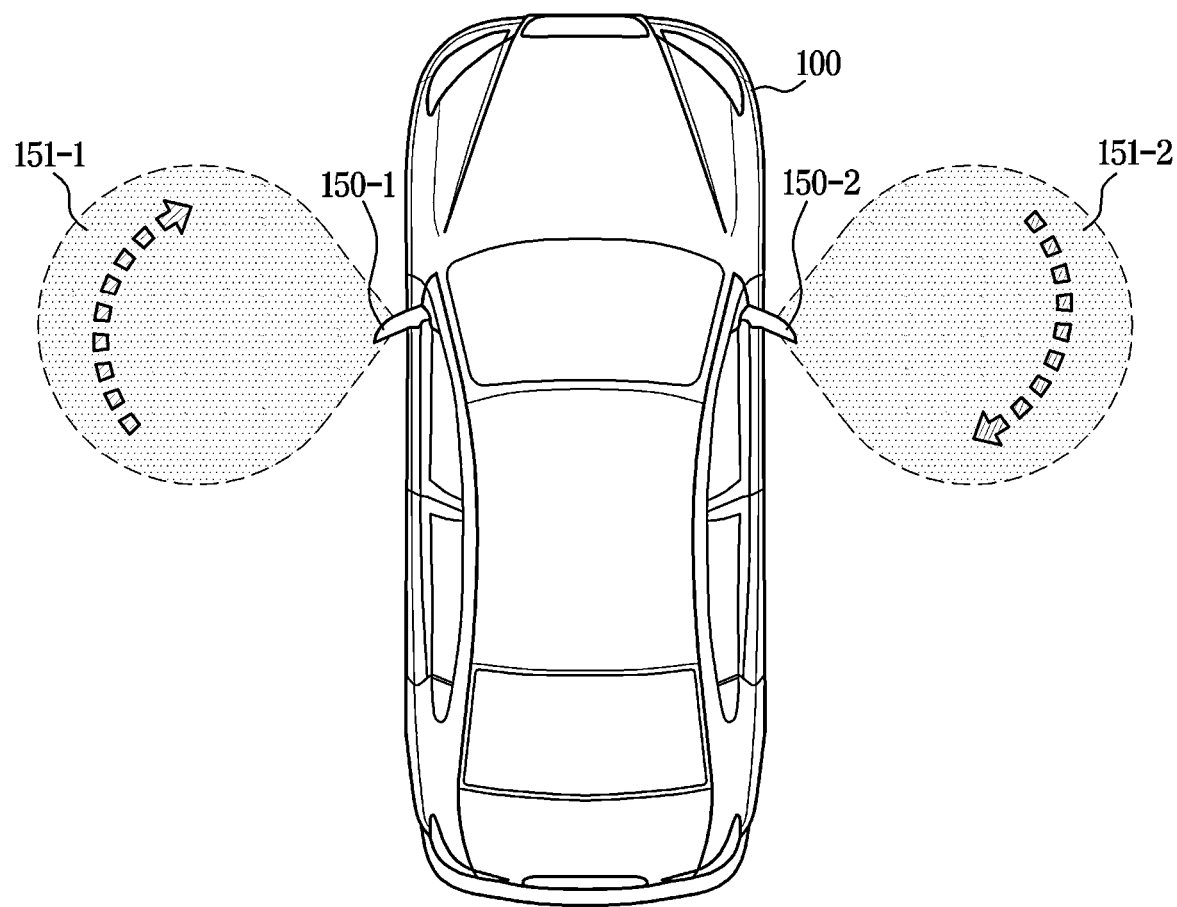
FIG. 4 is a diagram illustrating an example of predicting a moving direction and displaying a moving area using a puddle lamp in the vehicle according to the embodiment.

FIG. 4 is a diagram illustrating an example of predicting a moving direction and displaying a moving area using a puddle lamp in the vehicle 100 according to the embodiment.

In the following description with reference to FIG. 4, the display 150 is illustrated as a puddle lamp provided in the side mirror, but the present disclosure is not limited thereto, and the display 150 may include any configuration configured for emitting light to the outside of the vehicle 100, for example, a headlamp.

Referring to FIG. 4, the controller 110 may control the display 150 provided on the lower end portion of the side mirror of the vehicle 100 to emit light in the direction of the ground.

The controller 110 may determine a turning center point and a moving radius based on the driving torque and the specifications of the vehicle 100, and may divide the moving radius into a left display area 151-1 and a right display area 151-2.

The controller 110 may determine the moving radius in a size which is proportional to the driving torque of the vehicle 100 and inversely proportional to the weight of the vehicle 100, and correspondingly, set the sizes of the display areas 151-1 and 151-2.

Furthermore, the controller 110 may determine the moving direction of the vehicle 100 and display the moving direction in a way that an external object may recognize the moving direction, such as an arrow.

Only when the controller 110 displays the moving area on the road surface, the pedestrian 600 or other vehicle 700, which is an external object of the vehicle 100, may easily identify the moving area of the vehicle 100 with the naked eyes, so that an accident may be prevented and driving convenience may be improved.

When the display 150 is provided as a puddle lamp, the controller 110 may vary the inclination of the puddle lamp to adjust the emission area so that the size or position of the display areas 151-1 and 151-2 may be changed.

Furthermore, when the display 150 is a headlamp, the controller 110 may adjust the emission area of the headlamp so that the size or the position of the display areas 151-1 and 151-2 may be changed.

Figure 5:
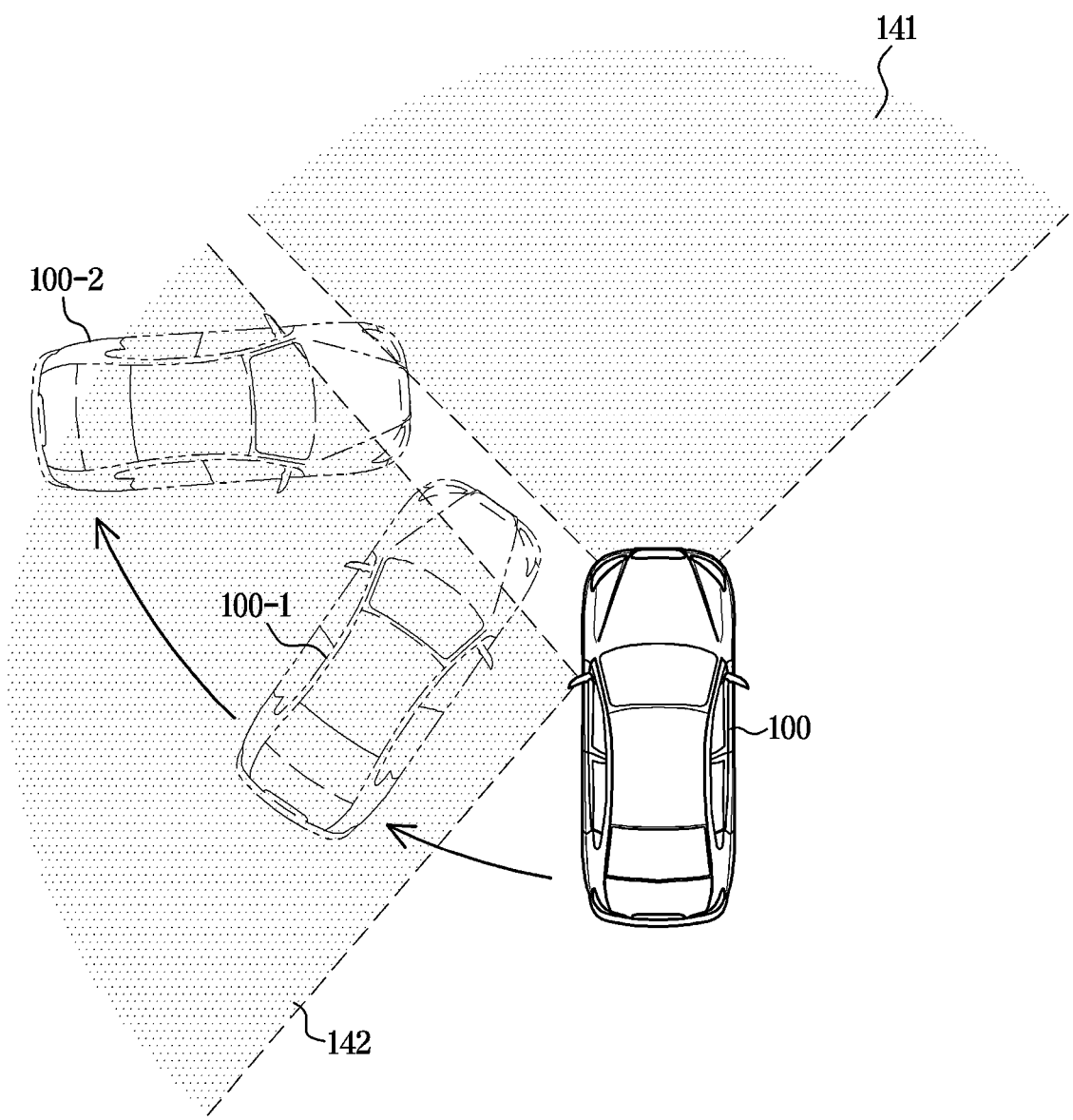
FIG. 5 is a diagram illustrating a movement of the vehicle and an obstacle recognition area by a vehicle camera in the vehicle according to the embodiment.

FIG. 5 is a diagram illustrating a movement of the vehicle 100 and an obstacle recognition area by the camera 140 in the vehicle 100 according to the embodiment.

Referring to FIG. 5, the vehicle 100 according to an exemplary embodiment of the present disclosure is a vehicle 100 configured for four-wheel independent steering, and may direct the rear wheels to have angles as shown in FIG. 5 and may move in a way to slide.

In the instant case, the controller 110 may detect an obstacle located on the front or located on the sides and rear through at least one camera 140 provided in the vehicle 100.

The cameras 140 in FIG. 5 include a front camera 140 for photographing the front area of the vehicle 100 and a side camera 140 for photographing the side of the vehicle 100, and each camera 140 may be a separate camera 140 configured to detect an obstacle or a surround view camera or front camera 140 provided in the vehicle 100.

The vehicle 100 may be stopped in a state that the long axis coincides with a front detection area 141, and then may move to the left side by steering the rear wheels according to the direction of the arrow (indicated as a vehicle 100-1).

Thereafter, the vehicle 100 may continue moving to have a moving route moving about 90 degrees to the left (indicated as the vehicle 100-2). In the instant case, when an obstacle, such as a pedestrian 600 or another vehicle 700, is present on the moving route of the vehicle 100, the controller 110 may detect the obstacle through the camera 140 photographing a side detection area 142.

When an obstacle is detected, the controller 110 may determine a route avoiding the detected obstacle as a moving route. Accordingly, the controller 110 may control the displays 151-1 and 151-2 based on to the route avoiding the obstacle to display a moving area.

Hereinafter, a method of differently displaying a danger area 300 and a safety area 400 in consideration of a moving area will be described.

Figure 6:
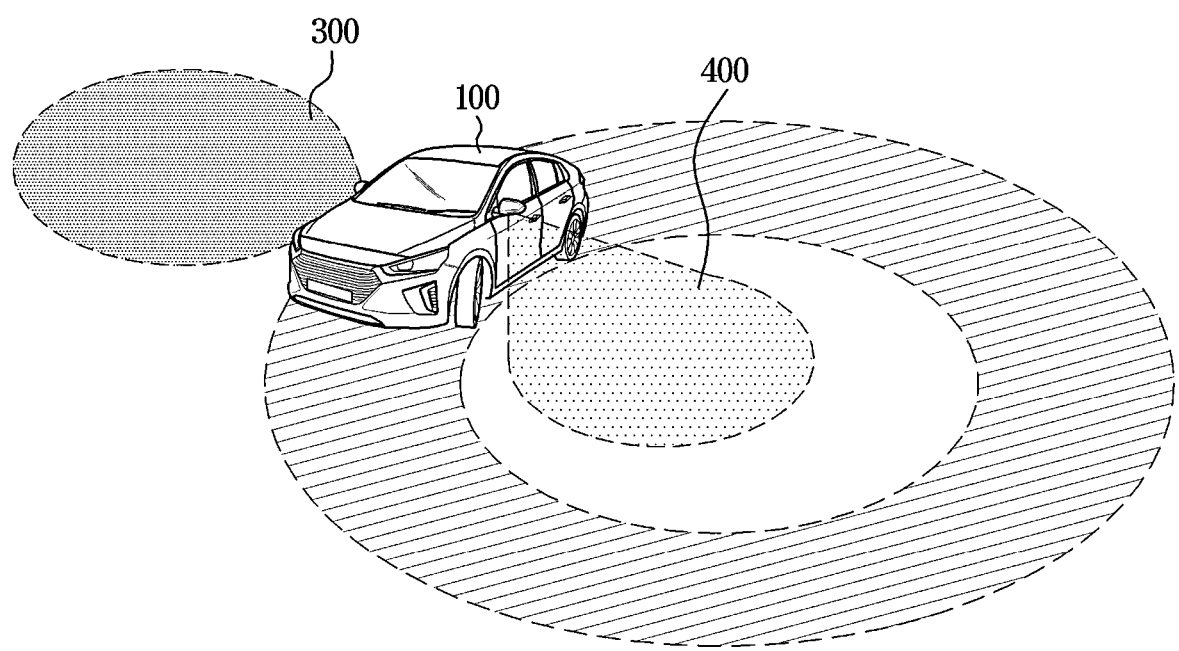
FIG. 6 is a diagram illustrating a danger area and a safety area that are differently displayed in the vehicle according to the embodiment.

FIG. 6 is a diagram illustrating a danger area 300 and a safety area 400 differently displayed in the vehicle 100 according to the embodiment.

Referring to FIG. 6, the controller 110 may display a danger area 300 at one side of the vehicle 100 and a safety area 400 at another side of the vehicle 100.

The controller 110 may control the display 150 in the direction of the moving route of the vehicle 100 to display the danger area 300 and control the display 150 in the direction opposite to the moving route of the vehicle 100 to display the safety area 400.

In the instant case, the controller 110 may allow emission colors or emission intensities of light to be different between the danger area 300 and the safety area 400 so that the danger area 300 is differentiated from the safety area 400.

As the controller 110 differentiates the danger area 300 and the safety area 400 so that the external object, such as the pedestrian 600, and the other vehicle 700, easily identify the danger area 300 and the safety area 400 with the naked eyes, the external object may easily identify the moving direction of the vehicle 100. Accordingly, the risk of accidents may be significantly reduced.

Furthermore, the pedestrian 600 or the other vehicle 700 close to the danger area 300 may change the course to proceed in the direction of the safety area 400, so that passage of the pedestrian 600 and the other vehicle 700 may be facilitated without any other instruction from the driver.

In FIG. 6, a dashed area represents a heading direction of the vehicle 100, which is incapable of four-wheel independent steering, and although the heading direction may be easily predicted by the pedestrian 600 or other vehicle 700, a plurality of displays 150 may be additionally used to display the danger area 300 on the front or rear side thereof.

Figure 7A:
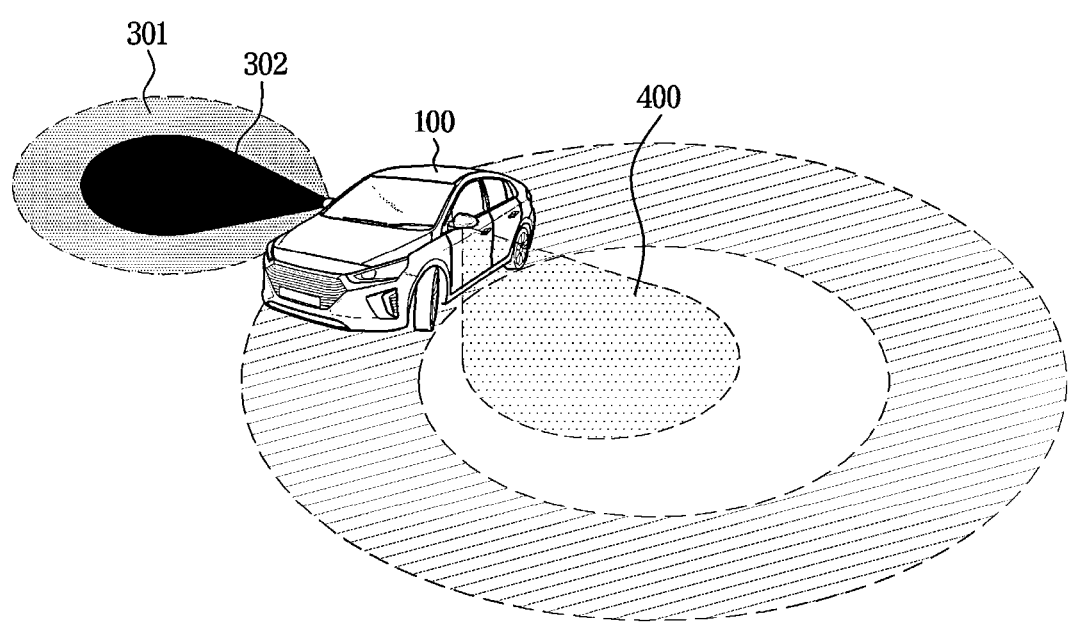
FIG. 7A and FIG. 7B are diagrams illustrating an example of subdivision of the danger area while the safety area and the danger area are differently displayed in the vehicle according to the embodiment.
Figure 7B:
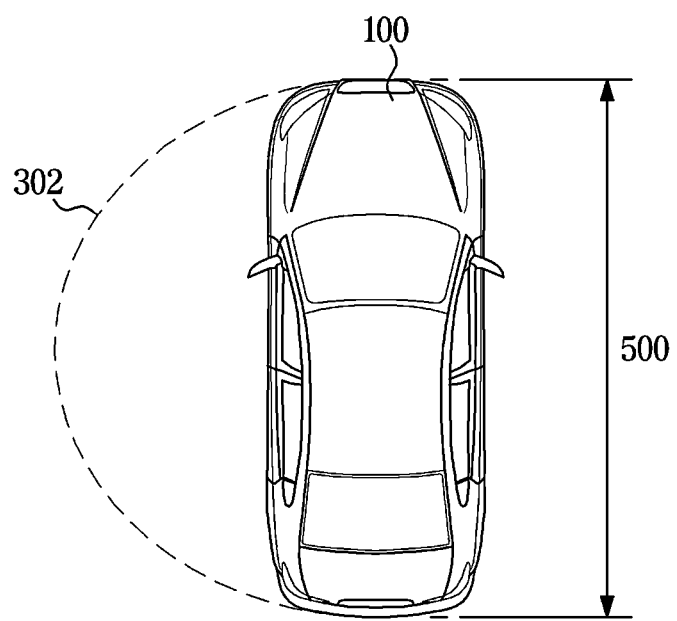

FIG. 7A and FIG. 7B are diagrams illustrating an example of subdivision of the danger area while the safety area and the danger area are differently displayed in the vehicle according to the embodiment.

Referring to FIG. 7A, the controller 110 may display the danger area 300 which includes a first area 301 and a second area 302.

In the instant case, the controller 110 may display the first area 301 and the second area 302 to be differentiated by the emission color or emission intensity. The method of displaying the first area 301 and the second area 302 is not limited as long as the first area 301 and the second area 302 are differentiated from each other.

The controller 110 may set the first area 301 as an area including a size and shape which is increased or decreased according to the lateral acceleration of the vehicle 100, and may set the second area 302 as an area fixed based on the vehicle length 500.

Referring to FIG. 7B in conjunction with FIG. 7A, the second area 302 may be set as a semicircle having the vehicle length 500 as a diameter. Because the second area 302 has the vehicle length of the vehicle 100 as the diameter, the second area 302 may represent the minimum safety distance to avoid a collision with the vehicle 100 while the vehicle 100 is turning or moving.

Accordingly, the controller 110 may express the second area 302 corresponding to the minimum safety distance in the danger area 300 with a dark emission color and strong emission intensity, and express the first area 301 with a relatively light emission color and a weak emission intensity to be contrasted with the second area 302.

Accordingly, the external object may recognize that the second area 302 is an area with a high possibility of an accident and the first area 301 is an area with a low possibility of an accident but is an area to be aware of, so that the corresponding areas may be avoided.

Figure 8B:
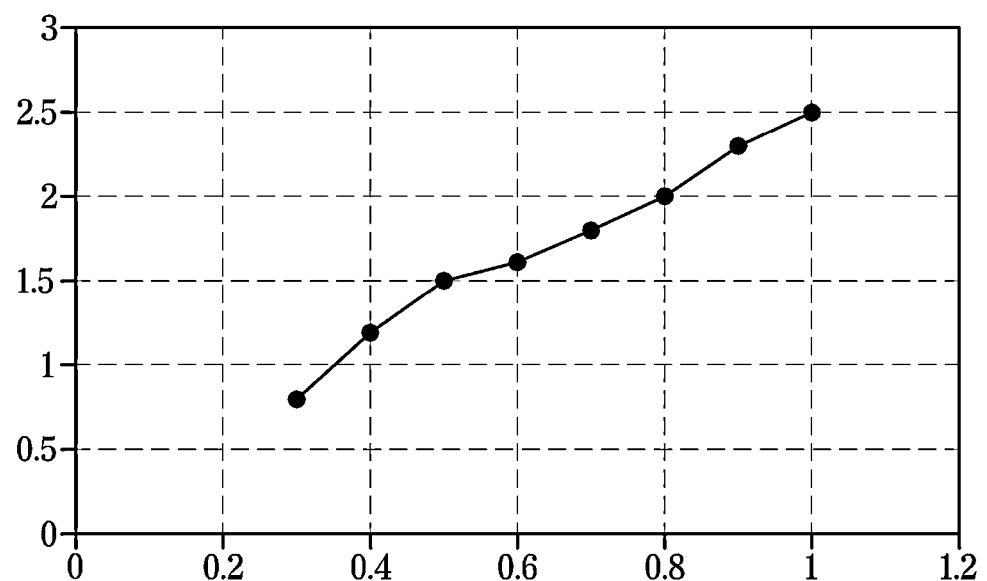

FIG. 8A and FIG. 8B are diagrams illustrating a relationship between a lateral acceleration and a light emission area in the vehicle 100 according to the embodiment.

The controller 110 may determine the lateral acceleration of the vehicle 100 based on the starting torque value of the vehicle 100 and the specifications of the vehicle 100 to determine the moving area, and display the moving area separately as the danger area 300 and the safety area 400 as described in FIG. 7.

Referring to the table of FIG. 8A and the graph of FIG. 8B, when the lateral acceleration is 0.3, the semicircle of the danger area 300 corresponding to the light emission area may have a diameter of 0.8, and when the lateral acceleration is 0.6, the semicircle of the danger area 300 corresponding to the light emission area may have a diameter of 1.6, and when the lateral acceleration is 1, the semicircle of the danger area 300 corresponding to the light emission area may have a diameter of 2.5.

The above figures are exemplary, and the controller 110 may increase the light emission area in proportion to the increasing lateral acceleration.

Because an increase in lateral acceleration of the vehicle 100 represents a rapid increase in the speed at which the vehicle 100 moves in the left and right directions, the danger area 300 based on the movement signal of the vehicle 100 received in a stationary state of the vehicle 100 may not be sufficient for protecting external objects.

An increase in lateral acceleration of the vehicle 100 represents a decrease in the time taken to reach the external object existing in the moving area of the vehicle 100. Therefore, even a nearby external object, which is located outside of the danger area 300 before the increase of the lateral acceleration, may have an accident with the movement of the vehicle 100, for which the danger area 300 needs to be increased.

Therefore, the control 110 may be configured to, when the lateral acceleration determined by the torque of the vehicle 100 and the specifications of the vehicle 100 increases, increase the size of the light emission area corresponding to the danger area 300 of the vehicle 100, and when the lateral acceleration decreases, decrease the size of the light emission area corresponding to the danger area 300 of the vehicle 100.

Accordingly, the vehicle 100 according to the exemplary embodiment of the present disclosure may secure the reliability of display of the danger area 300 involved in the movement of the vehicle 100 even when the speed of the vehicle 100 increases or decreases.

Figure 9A:
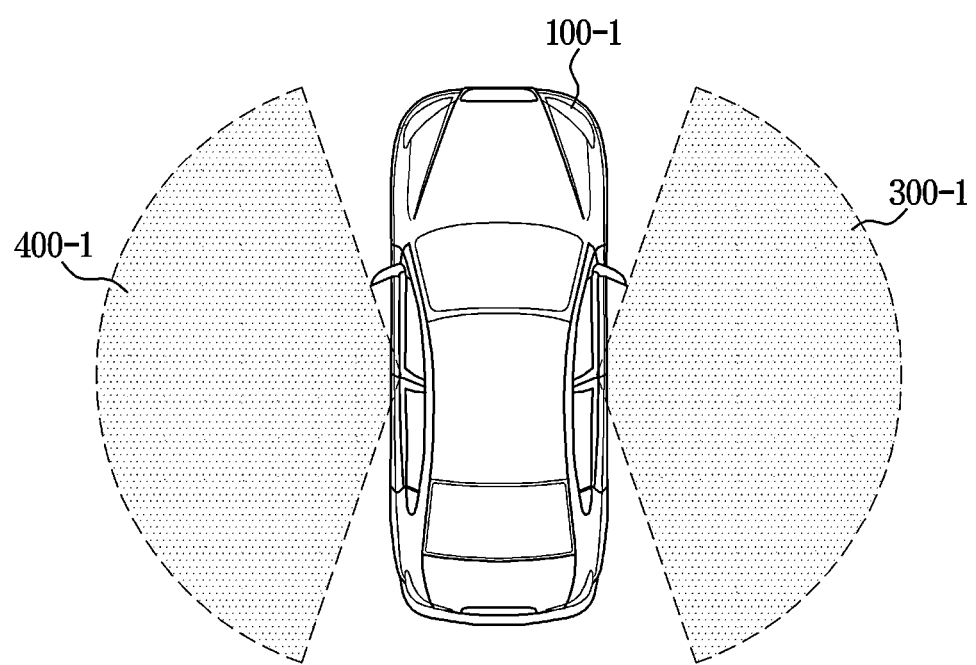
FIG. 9A and FIG. 9B are diagrams illustrating a real-time change of a light emission area in the vehicle according to the embodiment.
Figure 9B:
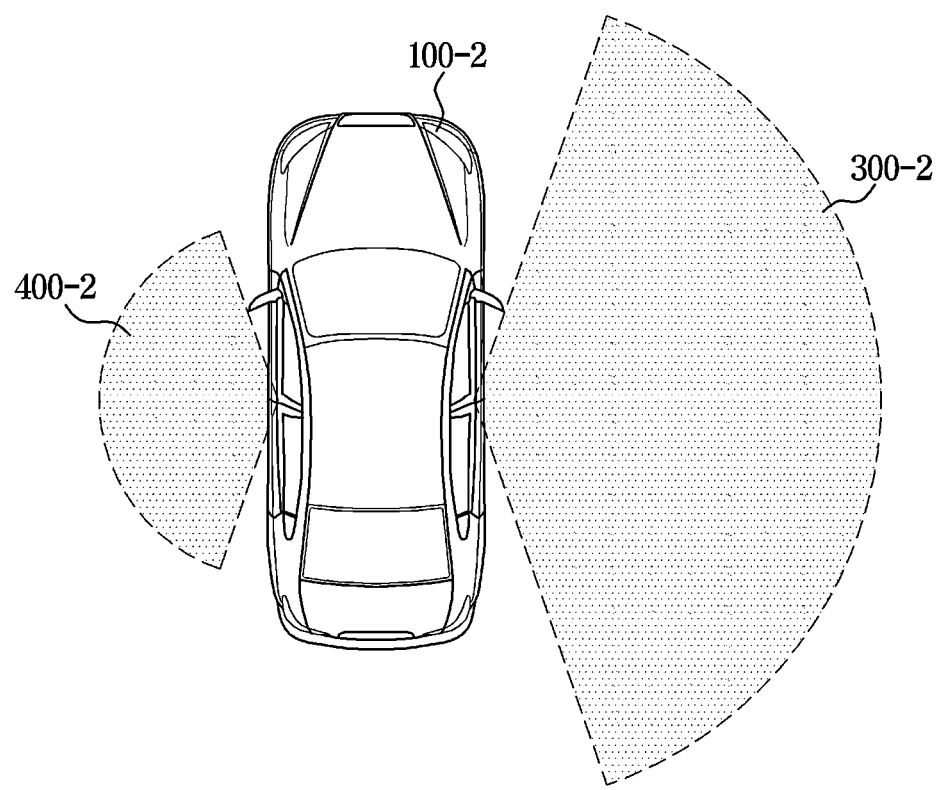

FIG. 9A and FIG. 9B are diagrams illustrating a real-time change of a light emission area in the vehicle according to the embodiment.

Referring to FIG. 9A, when it is determined that a vehicle 100-1 is in a stationary state or there is no change in lateral acceleration, the controller 110 may display a danger area 300-1 and a safety area 400-1 in the same size.

Referring to FIG. 9B, it may be seen that a vehicle 100-2 is moving to the right side on the drawing by a movement signal, and a danger area 300-2 is displayed greater than a safety area 400-2.

Because the vehicle 100-2 moves to the right side and the lateral acceleration increases, and external objects located in the vicinity of the safety area 400-2 become distant away from the vehicle 100-2 at a rapid speed, there is no need to display the safety area 400-2 in a large size, so that the controller 110 may display the safety area 400-2 in a small size.

On the other hand, because the vehicle 100-2 moves to the right, the controller 110 increases the size of the danger area 300-2 to notify an external object that the vehicle 100-2 may reach the danger area 300-2 faster than before the lateral acceleration increases.

Figure 10:
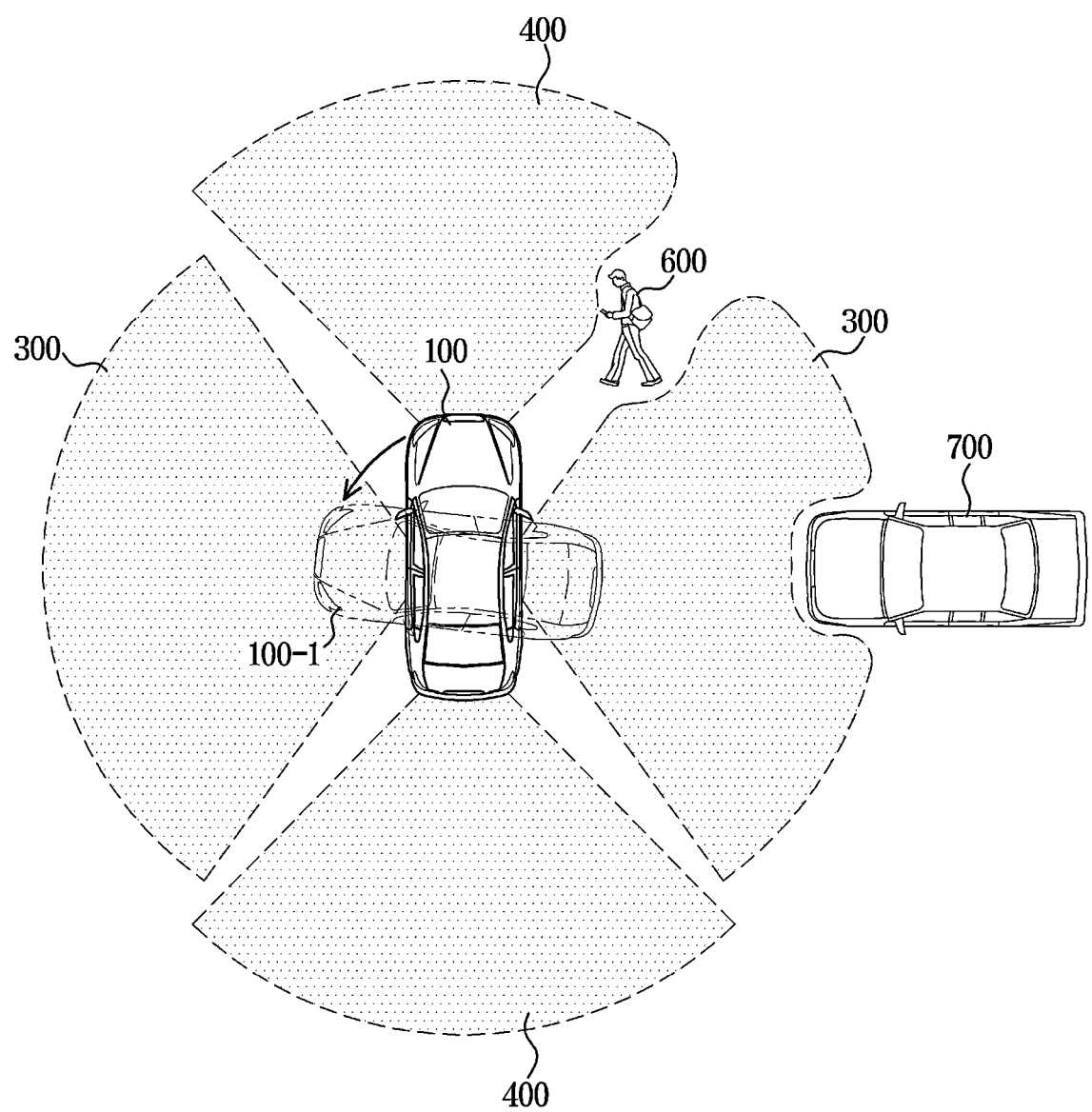
FIG. 10 is a view exemplarily illustrating an exemplary embodiment in which the vehicle according to the exemplary embodiment turns in place.

FIG. 10 is a view exemplarily illustrating an exemplary embodiment in which the vehicle according to the exemplary embodiment turns in place.

Referring to FIG. 10, the vehicle 100 according to the exemplary embodiment of the present disclosure is a vehicle 100 configured for four-wheel independent steering, and may perform turning in place by rear wheel steering control.

The vehicle 100, even during turning in place, may have a chance of collision with an external object, such as a pedestrian 600 or another vehicle 700, so that the controller 110 needs to differently display the danger area 300 and the safety area 400.

The controller 110 may, to differently display the danger area 300 and the safety area 400, analyze image data obtained from the camera 140 into a plurality of image frames to determine whether an obstacle exists on the moving route.

The vehicle 100 is stopped in a state that the long axis coincides with a front detection area 141, and thereafter, the vehicle 100 may turn in place by steering of the rear wheels according to the direction of the arrow.

Thereafter, the vehicle 100-1 may continue turning in place to have a moving route rotating about 90 degrees to the left. In the instant case, when an obstacle, such as a pedestrian 600 or another vehicle 700, is present on the moving route of the vehicle 100-1, the controller 110 may detect the obstacle through the camera 140 that photographs a side detection area 142.

When an obstacle is detected, the controller 110 may determine as a route avoiding the detected obstacle as a moving route. Accordingly, the controller 110 may control the display 150 based on the route avoiding the obstacle to display the moving area.

In the case of turning in place, the controller 110 may divide the display 150 on one side to determine a front area in the rotation direction as the safety area 400 and a rear area in the rotation direction as the danger area 300.

The vehicle 100 may be divided into a front portion including a bonnet and a rear portion including a trunk of the vehicle 100, and when the vehicle 100 is rotated counterclockwise, an external object located on the left side of the vehicle 100 may have a risk of collision with the front portion of the vehicle 100.

Accordingly, the controller 110 may, to prevent a collision of an external object with the front portion of the vehicle 100, determine an area adjacent to the front portion of the vehicle 100 as the danger area 300, and determine an area adjacent to the rear portion of the vehicle 100 as the safety area 400.

Accordingly, the controller 110 may control the display 150 on the left side of the vehicle 100 rotating in the counterclockwise direction to display an area adjacent to the front portion of the vehicle 100 as the danger area 300, and control the display 150 on the right side of the vehicle 100 rotating in the counterclockwise direction to display an area adjacent to the rear portion of the vehicle 100 as the danger area 300.

Figure 11:
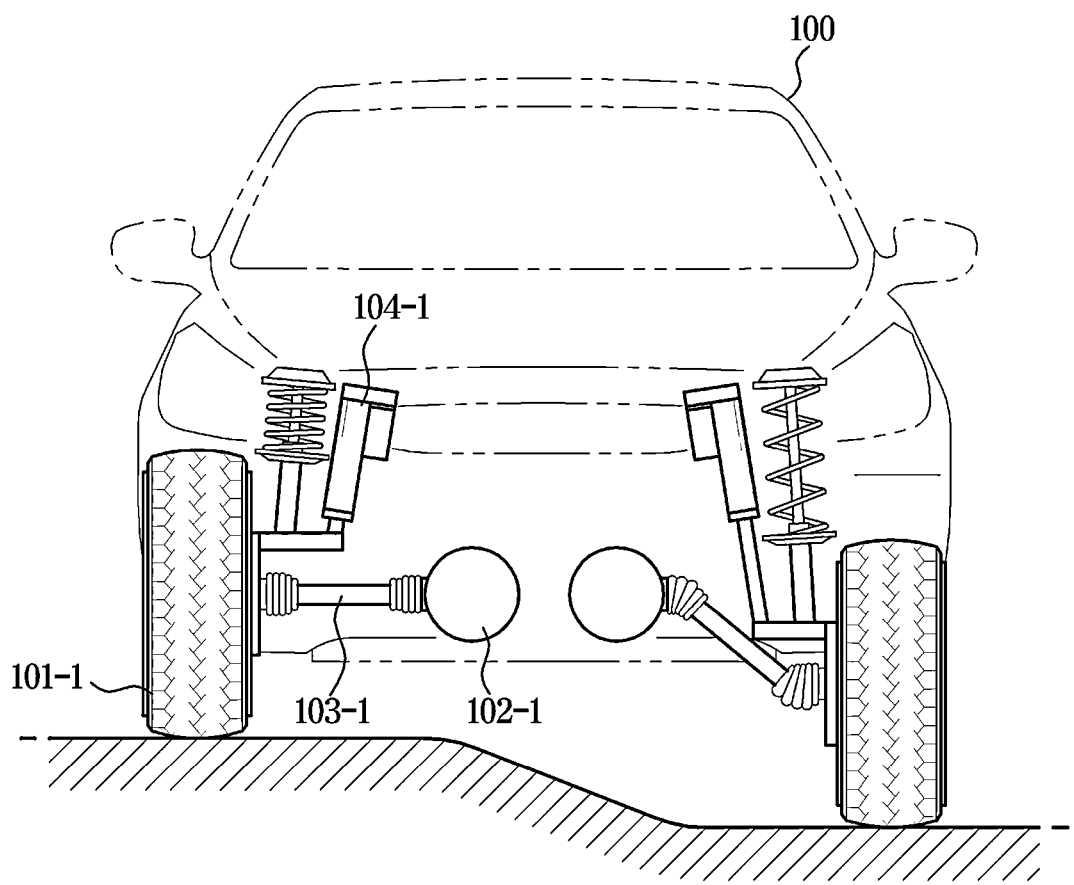
FIG. 11 is a view for describing a process of correcting a road level difference in the vehicle according to the embodiment.

FIG. 11 is a view for describing a process of correcting a road surface roughness in the vehicle 100 according to the embodiment.

Referring to FIG. 11, it may be seen that the vehicle 100 is maintained in a horizontal state by the wheel height actuator 104-1 as described above with reference to FIG. 3.

The controller 110 may determine the wheel step difference of all wheels of the vehicle 100, and accordingly, control the wheel height actuator 104-1 so that the wheel step difference is minimized.

Accordingly, the vehicle 100 according to the exemplary embodiment of the present disclosure may measure the lateral acceleration when the vehicle 100 is maintained in a horizontal state, and display the danger area 300 and the safety area 400 while minimizing the influence of the road surface.

In the vehicle 100 of FIG. 11, it may be seen that a wheel tire 101-1 on one side of the vehicle 100 is located in a zone higher than a zone in which a wheel tire 101-1 on the other side is located.

Even when the wheel tires 101-1 are located on road surfaces of different heights, the controller 110 may control the wheel height actuator 104-1 to secure the horizontal state. Accordingly, the controller 110 may determine the moving area without an error when controlling the steering actuator 102-1 and the steering linkage 103-1 by determining the lateral acceleration.

When the controller 110 determines the lateral acceleration in a state in which the height of each wheel tire 101-1 is not corrected, the lateral acceleration may be measured to be lower or higher for the output torque on a flat surface.

When the controller 110 measures the lateral acceleration to be lower or higher for the output torque of the vehicle 100 and thus an error occurs, the danger area 300 may be displayed larger or smaller than the size needing to be displayed in practice.

Therefore, to prevent such an error, the controller 110 may control the wheel height actuator 104-1 to secure the horizontal state of the vehicle 100 and control to display the danger area 300 and the safety area 400.

Figure 12:
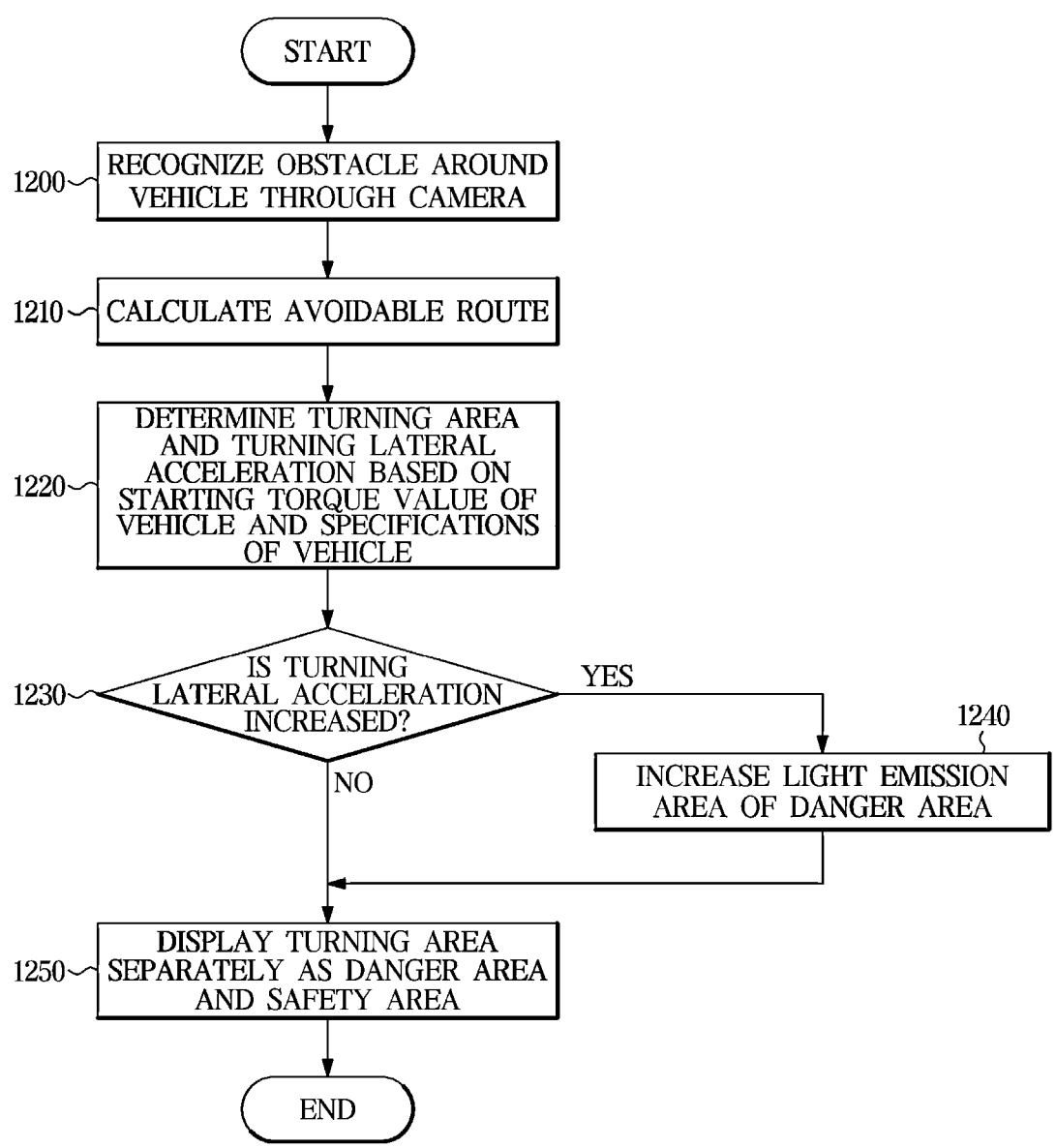
FIG. 12 is a diagram illustrating a control flowchart of the vehicle according to the embodiment.

FIG. 12 is a diagram illustrating a control flowchart of the vehicle 100 according to the embodiment.

Referring to FIG. 12, the controller 110 of the vehicle 100 according to the exemplary embodiment of the present disclosure may recognize an obstacle of a surrounding of the vehicle 100 through at least one camera 140 provided in the vehicle 100 (1200). In the instant case, the surrounding of the vehicle 100 is not limited to the front side of the vehicle 100, and may include all sides.

The controller 110 may, upon determining that an obstacle exists in a moving area based on a received movement signal, determine an avoidable route configured for moving by avoiding the obstacle (1210).

Thereafter, the controller 110 may determine a moving area and a moving lateral acceleration based on the starting torque value of the vehicle 100 and the specifications of the vehicle 100 (1220). In the instant case, the moving area includes a turning area, and the moving lateral acceleration includes a turning lateral acceleration.

The controller 110 may, when the lateral acceleration increases (1230), increase the size of the light emission area of the danger area 300 in proportion to the increase of the lateral acceleration (1240). Conversely, the controller 110 may, when the lateral acceleration decreases, decrease the size of the light emission area of the danger area 300 in proportion to the decrease of the lateral acceleration (1240).

The controller 110 may, when the sizes of the danger area 300 and the safety area 400 are determined, display the moving area separately as the danger area 300 and the safety area 400 (1250).

Because the specific embodiment related to the method of controlling the vehicle 100 is the same as the exemplary embodiment of the present disclosure related to the vehicle 100 described above, details thereof will be omitted.

As is apparent from the above, the vehicle and the method of controlling the same according to the exemplary embodiment of the present disclosure can compensate for a difficulty in predicting a movement of the vehicle only with a smartphone screen at an outside of the vehicle, and allow a moving area of the vehicle to be easily identified.

Furthermore, the vehicle and the method of controlling the same according to the exemplary embodiment of the present disclosure can allow an external object to easily identify the moving area of the vehicle, and differently display a danger area and a safety area, so that safety may be promoted without interference with the passage of the external object.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a display configured to emit light to a ground surface;
   a communicator configured to receive a movement signal of the vehicle through communication with an external terminal; and
   a controller communicatively connected to the communicator and configured to determine a moving area of the vehicle based on the received movement signal of the vehicle, determine a danger area and a safety area included in the moving area, and control the display to emit light to the danger area and the safety area,
   wherein the controller increases a size of a light emission area of the danger area in proportion to an increase in lateral acceleration.

2. The vehicle of claim 1, wherein the controller is configured to detect an obstacle around the vehicle using at least one camera provided in the vehicle and the external terminal and determine a route path avoiding the obstacle as the moving area.

3. The vehicle of claim 1, wherein the light emission area is varied according to the lateral acceleration of the vehicle, and the lateral acceleration is determined by a starting torque value of the vehicle and specifications of the vehicle.

4. The vehicle of claim 1, wherein the controller is configured to determine a turning center and a moving radius of the vehicle based on a driving torque of the vehicle and specifications of the vehicle to determine the moving area.

5. The vehicle of claim 4, wherein the controller is configured to determine the moving radius in a size which is proportional to the driving torque of the vehicle and inversely proportional to a weight of the vehicle.

6. The vehicle of claim 1, wherein the controller is configured to indicate the moving area so that the danger area and the safety area are differentiated by emission colors and intensities of light.

7. The vehicle of claim 1,
wherein the controller is configured to divide the danger area into a first area corresponding to a semicircle having a vehicle length of the vehicle as a diameter thereof, and a second area corresponding to a remaining portion of the danger area, and
wherein the second area has the light emission area which is varied according to the lateral acceleration determined from a starting torque value of the vehicle and specifications of the vehicle.

8. The vehicle of claim 7, wherein the controller is configured to increase the diameter of the semicircle of the light emission area based on the lateral acceleration being increased.

9. The vehicle of claim 1, wherein the controller is configured to determine the moving area based on a manipulation of a steering wheel or a direction of a turn signal of the vehicle.

10. The vehicle of claim 1, wherein the controller is configured to determine a road surface roughness with a wheel level sensor of the vehicle to perform a level correction, and detect an obstacle around the vehicle using at least one camera provided in the vehicle and the external terminal to determine the moving area.

11. A method of controlling a vehicle, the method comprising:
emitting, by a display, light to a ground surface;
receiving, by a communicator, a movement signal of the vehicle through communication with an external terminal;
determining, by a controller, a moving area of the vehicle based on the received movement signal of the vehicle;
determining, by the controller, a danger area and a safety area included in the moving area; and
emitting, by the display controlled by the controller, light to the danger area and the safety area,
wherein the emitting of light to the danger area and the safety area includes increasing a size of a light emission area of the danger area in proportion to an increase in lateral acceleration.

12. The method of claim 11, wherein the determining of the moving area of the vehicle includes detecting an obstacle around the vehicle using at least one camera provided in the vehicle and the external terminal to determine the moving area.

13. The method of claim 11, further including:
varying the light emission area according to the lateral acceleration of the vehicle which is determined by a starting torque value of the vehicle and specifications of the vehicle.

14. The method of claim 11, wherein the determining of the moving area includes determining a turning center and a moving radius of the vehicle based on a driving torque of the vehicle and specifications of the vehicle to determine the moving area.

15. The method of claim 14, wherein the controller is configured to determine the moving radius in a size which is proportional to the driving torque of the vehicle and inversely proportional to a weight of the vehicle.

16. The method of claim 11, wherein the emitting of light to the danger area and the safety area includes indicating the moving area so that the danger area and the safety area are differentiated by emission colors and intensities of light.

17. The method of claim 11,
wherein the emitting of light to the danger area and the safety area includes dividing the danger area into a first area corresponding to a semicircle having a vehicle length of the vehicle as a diameter thereof, and a second area corresponding to a remaining portion of the danger area, and
wherein the second area has the light emission area which is varied according to the lateral acceleration determined from a starting torque value of the vehicle and specifications of the vehicle.

18. The method of claim 17, wherein the varying of the light emission area includes increasing the diameter of the semicircle of the light emission area based on the lateral acceleration being increased.

19. The method of claim 11, wherein the emitting of light to the danger area and the safety area includes emitting light based on a manipulation of a steering wheel or a direction of a turn signal of the vehicle.

20. The method of claim 11, wherein the determining of the moving area of the vehicle includes determining a road surface roughness with a wheel level sensor of the vehicle to perform a level correction, and detecting an obstacle around the vehicle using at least one camera provided in the vehicle and the external terminal to determine the moving area.

* * * * *